United States Patent [19]

Knudsen

[11] 4,453,416

[45] Jun. 12, 1984

[54] VORTEX SHEDDING FLOW MEASUREMENT

[75] Inventor: James K. Knudsen, Cleveland, Ohio

[73] Assignee: The Babcock & Wilcox Company, New Orleans, La.

[21] Appl. No.: 331,057

[22] Filed: Dec. 15, 1981

[51] Int. Cl.³ .................................................. G01F 1/32
[52] U.S. Cl. ................................. 73/861.24; 73/861.22
[58] Field of Search ........................ 73/861.22, 861.24; 200/83 P, 861.23

[56] References Cited

U.S. PATENT DOCUMENTS

| | | | |
|---|---|---|---|
| 3,564,915 | 2/1971 | Tomota et al. | 73/861.22 |
| 4,003,251 | 1/1977 | Herzl | 73/861.24 |
| 4,006,083 | 1/1977 | Westervert et al. | 200/83 P |
| 4,085,614 | 4/1978 | Curran et al. | 73/861.24 |

*Primary Examiner*—Gerald Goldberg
*Assistant Examiner*—Hezron Williams
*Attorney, Agent, or Firm*—Vytas R. Matas; Robert J. Edwards

[57] ABSTRACT

An improved vortex shedding flowmeter sensor and method are disclosed. The vortex shedding sensor is a bistable element. The element is constrained to operate in a transition deflection region between two stable stages. The element tends to alternate states at the frequency of vortex shedding, thereby amplifying the input signal at low levels and extending the low range of flow rate measurement.

4 Claims, 6 Drawing Figures

FIG. 1
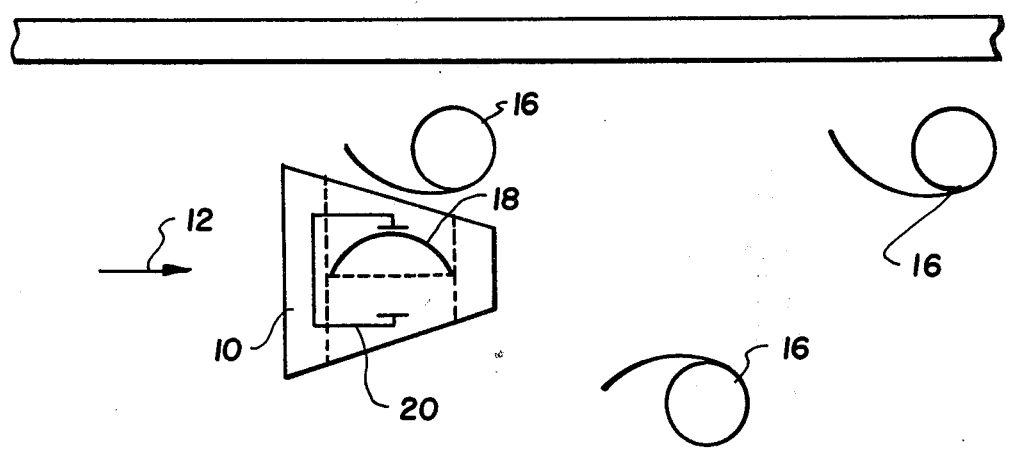
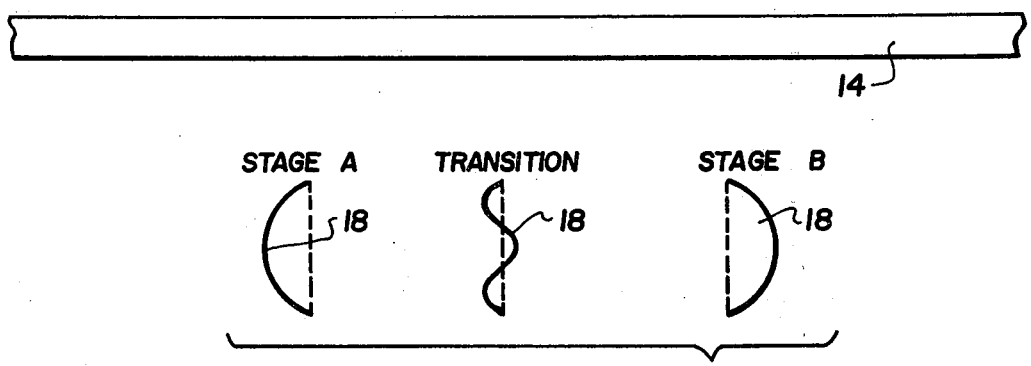
FIG. 2
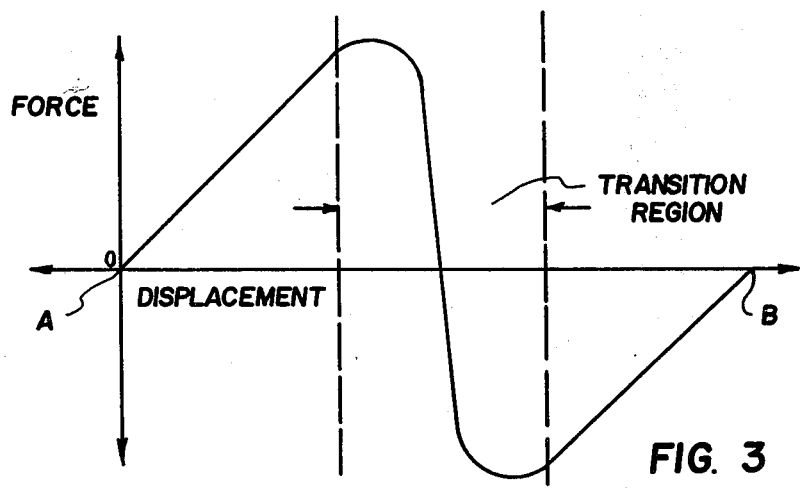
FIG. 3

VORTEX SHEDDING FLOW MEASUREMENT

FIELD AND BACKGROUND OF THE INVENTION

The invention relates, in general, to flow measurement and flow meters, and, more particularly, to a new and useful method for vortex shedding flow measurement.

Vortex shedding flow measurement deals with the eddies or vortices which shed from an obstruction, known as a bluff body or strut, which is placed in the path of a flow stream. As the flow stream contacts the bluff body, the surface layer separates from opposite sides of the bluff body. Shedding alternatingly occurs at both of the opposite sides. The vortex shedding frequency is proportional to the flow rate across the bluff body.

In known vortex shedding arrangements, the differential pressure induced by vortex shedding has been sensed by a variety of monostable analog elements. Among these elements are diaphragms which deflect proportional to the differential pressure, the deflection of the bluff body itself or a secondary body due to the pressure drop, or fluid flow which is induced due to this differential. A disadvantage of these sensing means is that the frequency of vortex shedding is proportional to flow rate as well as the amplitude of the differential pressure pulse. Therefore, at low flow rates the output of an analog sensor can be too low to measure.

SUMMARY OF THE INVENTION

In accordance with the invention, a bistable mechanical element is utilized to sense vortex shedding. Moreover, the element, which is preferably a bistable diaphragm or a diaphragm actuating a bistable sensor, is constrained to operate within a transition range so as to react with relatively large displacements for very small input force.

Thus, in accordance with the invention, there is provided, in a vortex shedding flowmeter, the improvement comprising a bistable element, means for restricting the element for movement responsive to vortex shedding within a transition region between the stable states of the bistable element, and means for measuring the deflections of the element.

The invention also provides an improved method of sensing vortex shedding in flow measurement comprising the steps of constraining a bistable element for operation in a transition region and measuring the deflection of the element.

The various features of novelty which characterize the invention are pointed out with particularity in the claims annexed to and forming a part of this disclosure. For a better understanding of the invention, its operating advantages and specific objects attained by its uses, reference is made to the accompanying drawings in which a preferred embodiment of the invention is illustrated.

BRIEF DESCRIPTION OF THE DRAWING

In the drawing:

FIG. 1 is a schematic representation of a bluff body arranged within a flow conduit;

FIG. 2 is a deflection diagram schematically illustrating the states of a diaphragm;

FIG. 3 is a force-displacement diagram illustrating the loading of the diaphragm of FIG. 2 at stable states A and B, as well as in the so-called transition region between states A and B;

DETAILED DESCRIPTION OF PREFERRED EMBODIMENT

Figure 4:
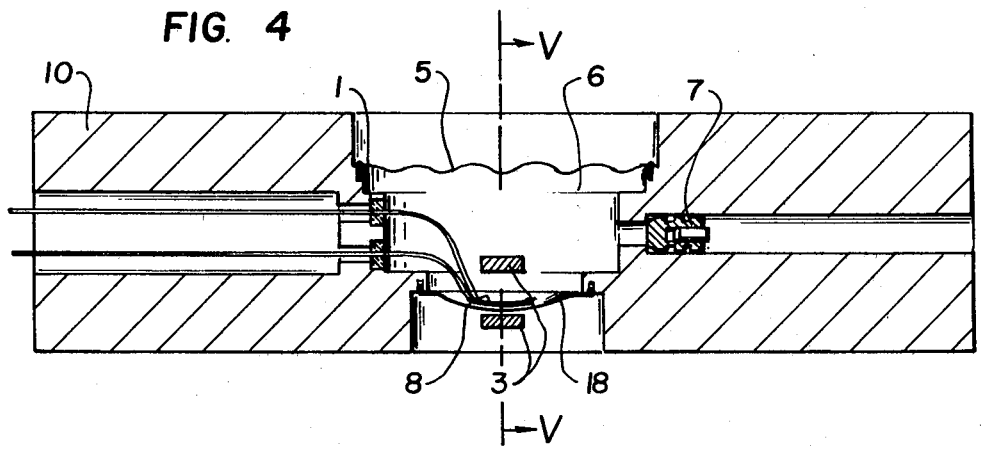
FIG. 4 is a front end view, partly broken away, viewed from the downstream end of a bluff body according to the invention.

Referring to the drawing with particular emphasis on FIG. 1 a bluff body 10 is shown, having a shape tapering from an upstream end to a downstream end, disposed in a flow conduit 14. As the fluid flow, the direction of which is represented by arrow 12, passes from the upstream to the downstream end of the bluff body 10, vortices 16 form at and are shed from opposite sides of the bluff body 10.

A bistable element 18, such as a diaphragm, is mounted to the bluff body 10 and restrained to operate in a transition region with the movement of the element 18 being monitored by a transducer 20. Structurally, such a restraint can be achieved, for example, by attaching the bistable diaphragm 18 to the bluff body 10 with a weld of a known type, such as a laser weld, electron beam weld, TIG weld or the like, such that it creates a seal across the body. Structural supports 3 are also attached adjacent to the bistable device to restrain the operation to a transition region which will be explained later. Glass sealed conductors 1, such as the kind that can be purchased from Glasseal Products Inc., Part No. TF120/20FBBE, are installed in the body 10 to bring the electrical signal out of the flow conduit. The electrical signal is created in a displacement transducer 8 which can be a strain gage, as illustrated in FIG. 4, for example as produced by BLH Electronics Corp., Part No. FAES4-44-35SX), or a piezoelectric crystal, a magnetic proximity sensor, a capacitance displacement sensor, or LVDT type mounted on the bistable device or restraining support so as to sense the motion.

The displacement transducer 8 can be sealed in a cavity 6 filled with an inert fluid (for example: Dow Corning 200 Fluid) and sealed with a plug 7, such as is produced by Lee Co., Part No. PLGA1250020), between a low spring rate, high volumetric capacitance diaphragm 5 and the sensing diaphragm 18. The displacement transducer 8 can also be encapsulated in some non-rigid encapsulant (such as G. E. silicone rubber adhesive sealant RTV126). The transducer can be metallized or covered with a metal coating similar in composition to the bluff body by plating, cladding or welding, Any of these methods will protect it from the process fluid flowing through the conduit.

Finally, this vortex sensing assembly can be assembled in a separate enclosure which can be inserted into or connected to the bluff body using welding, fasteners, or the like, Since the diaphragm 18 is restrained to operate only in the transition region, very small differential pressures can generate the force necessary to cause the large deflections because, as best seen in FIG. 3, in the center of the transition region a very small force in either direction causes the device to move toward one of its stable states. In addition, the magnitude of the displacement will not depend strictly on the input force. The large deflections of the bistable sensor 18 can be measured very easily using the displacement transducer such as a strain gauge model FAES4-44-35SX manufactured by BLH Electronics Corp. The diaphragm type strain gauge changes resistance with the strain induced to the diaphragm by its displacement.

The displacement is converted into an electrical signal and can be used as a straight frequency output or can be input to a signal conditioner. Circuitry is known for converting the displacement into an electrical signal. For example, an instruction manual by the Yokogawa Electric Work Inc. illustrates electrical schematic diagrams for current control and signal conditioning in connection with vortex flow measurement.

The inventive arrangement not only reduces the variation in the magnitude of the sensing pulses with flow rate but also allows the device to be used at much lower flow rates than was previously possible.

FIG. 3 graphically illustrates force as the ordinate and displacement as the abscissa of a force displacement diagram of a bistable diaphragm sensing element restrained in accordance with the invention. In the so-called transition region, the spring rate (Force/Displacement) decreases with displacement in the transition or "oil can" region of the device. This can be analogized to the pressing of the bottom of an oil can in a first direction and the automatic opposite return thereof. The bistable sensor is constrained to operate in the transition region, either by restricting its displacement or by providing an external restoring force to maintain the device in the "oil can" region. Operating in transition the sensor will react with relatively large displacements for very small input force. In this way a bistable diaphragm, or a diaphragm actuating a bistable sensor, can sense the differential pressures generated by the formation of vortex about a bluff body in a flow stream.

In order to limit the displacement of a bistable device, an external restoring force and be used to insure operation in transition region. This force can be supplied by a spring mechanically connected to the device or the diaphragm 5 being provided with the appropriate spring rate and being hydraulically coupled to the bistable sensing diaphragm 18.

The element will alternate states at the frequency of vortex shedding, thereby amplifying the input signal at low signal levels, extending the range of the device towards lower flow rates. Also, at variable input signal levels, the output remains relatively fixed in magnitude.

An element suitable as a diaphragm would predictively be composed of stainless steel or a nickel alloy, have a diameter ranging from one-quarter inch (63.5 mm) to one inch (254 mm), a thickness of 0.001 inch (0.254 mm) and a displacement of 0.0001inch (0.254 mm).

Figure 6:
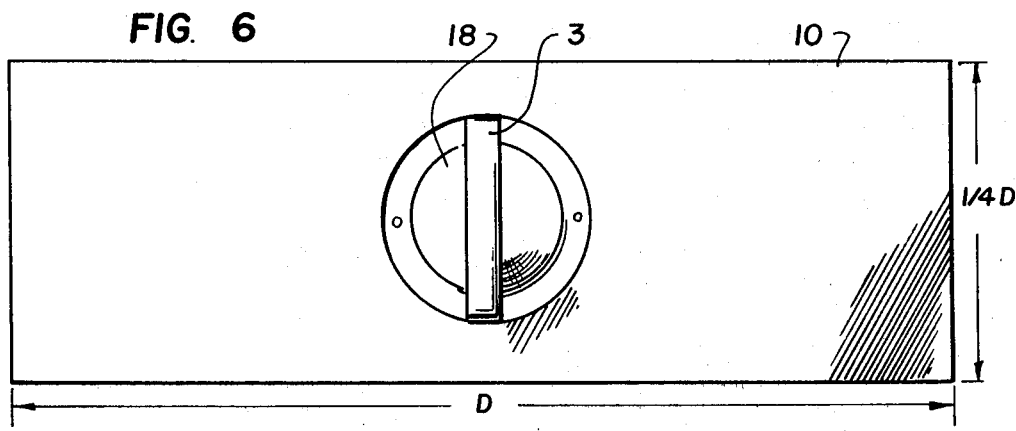
FIG. 6 is a bottom view of the bluff body of FIG. 4.
Figure 5:
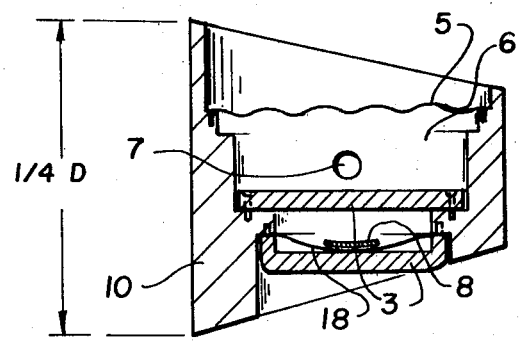
FIG. 5 is a sectional view taken along view line V—V of FIG. 4.

Using this approach the bluff body dimensions in terms of pipe diameter (D) would be approximately as illustrated in FIGS. 4 through 6. The size is only limited by manufacturing capabilities and would be from pipe diameters of about 0.5 inch (12.7 mm) or 1 inch (25.5 mm) to 8.0 inch (203.2 mm) or 12.0 inch (304.8 mm) and fluid velocities down to less than 1 Ft/sec. (0.3048 m/s) perhaps down to 0.1 Ft/sec (0.0304 m/s) and up to 33 Ft/sec. (10.0584 m/s).

While a specific embodiment of the invention has been shown and described in detail to illustrate the application of the principles of the invention, it will be understood that the invention may be embodied otherwise without departing from such principles.

What is claimed is:

1. In a vortex shedding flowmeter, of the type having a bluff body mounted in a flowstream, an improved sensor comprising a bistable element connected to the bluff body, means for constraining said element for displacement within a transition region responsive to vortex shedding of flow about the bluff body, and means for measuring the displacement of said element.

2. The improvement as set forth in claim 1, wherein said constraining means comprises means for restricting the displacement of said element.

3. The improvement as set forth in claim 1, wherein said constraining means comprises means for applying an external restoring force to said element to maintain the element within the transition region.

4. An improved method of sensing vortex shedding flow in vortex shedding flow measurement comprising constraining a bistable element for displacement within a transition region responsive to vortex shedding, and measuring the displacement of the element.

* * * * *